United States Patent
Ren et al.

(10) Patent No.: US 12,319,846 B2
(45) Date of Patent: Jun. 3, 2025

(54) PRESSURE-SENSITIVE ADHESIVE BASED ON ACRYLONITRILE BUTADIENE RUBBERS

(71) Applicant: tesa SE, Norderstedt (DE)

(72) Inventors: Yanjie Ren, Hamburg (DE); Sarah Bamberg, Hamburg (DE); Thorsten Krawinkel, Hamburg (DE)

(73) Assignee: tesa SE, Norderstedt (DE)

( * ) Notice: Subject to any disclaimer, the term of this patent is extended or adjusted under 35 U.S.C. 154(b) by 1061 days.

(21) Appl. No.: 17/226,486

(22) Filed: Apr. 9, 2021

(65) Prior Publication Data

US 2021/0317345 A1  Oct. 14, 2021

(30) Foreign Application Priority Data

Apr. 9, 2020 (EP) .................................. 20 169 117

(51) Int. Cl.
*C09J 109/02* (2006.01)

(52) U.S. Cl.
CPC .................................. *C09J 109/02* (2013.01)

(58) Field of Classification Search
CPC ....................................................... C09J 109/02
USPC ......................................................... 524/798
See application file for complete search history.

(56) References Cited

U.S. PATENT DOCUMENTS

| 5,888,650 A | 3/1999 | Calhoun et al. |
| 2003/0134112 A1 | 7/2003 | Kreckel et al. |
| 2018/0230342 A1 | 8/2018 | Putz et al. |

FOREIGN PATENT DOCUMENTS

| EP | 1 426 407 A1 | 6/2004 |
| EP | 3 279 283 A1 | 2/2018 |
| KR | 20150089207 A | * 8/2015 |
| WO | 97/46631 A1 | 12/1997 |
| WO | 2014/066195 A1 | 5/2014 |
| WO | 2014/067667 A1 | 5/2014 |
| WO | 2014/199455 A1 | 12/2014 |
| WO | WO 2017/025492 A1 | 2/2017 |

OTHER PUBLICATIONS

KR 2015 0089207—English abstract and English translation provided.
WO 2014/199455—English abstract and English Machine translation provided.
Database WPI Week 201561—Thomson Scientific, London, GB; an 2015-46333Y & KR 2015 0089207 A (Aug. 5, 2015).
Extended European Search Report completed Aug. 31, 2020.

* cited by examiner

*Primary Examiner* — Ling Siu Cho
*Assistant Examiner* — Ronald Grinsted
(74) *Attorney, Agent, or Firm* — Norris McLaughlin, P.A.

(57) ABSTRACT

Pressure-sensitive adhesives based on acrylonitrile-butadiene rubbers having good shock-resistance combined with easy removability of the adhesives from the substrate shall be provided. This is solved by a pressure-sensitive adhesive which comprises
  at least one acrylonitrile-butadiene rubber; and
  at least one tackifier resin,
and is characterized in that
the acrylonitrile content of the acrylonitrile rubber is less than 30 wt %;
the pressure-sensitive adhesive comprises at least one rosin resin as tackifier resin; and
the entirety of all tackifier resins has an acid number of 6-150.
The pressure-sensitive adhesive can be used for bonding parts in mobile electronic devices.

7 Claims, No Drawings

PRESSURE-SENSITIVE ADHESIVE BASED ON ACRYLONITRILE BUTADIENE RUBBERS

This application claims priority of European Patent Application No. 20 169 117.7, filed Apr. 9, 2020, the entire contents of which are hereby incorporated by reference herein.

The invention lies in the technical field of pressure-sensitive adhesives as they are used for temporary or permanent bonding of a broad variety of substrates. More specifically, the invention relates to a pressure-sensitive adhesive based on acrylonitrile-butadiene rubber and also to the use thereof.

Pressure-sensitive adhesives (PSAs) have been known for some considerable time. PSAs are adhesives which allow durable bonding to the substrate even under relatively weak applied pressure. A variety of compounds are suitable as a basis for PSAs.

Adhesive tapes equipped with PSAs, referred to as pressure-sensitive adhesive tapes, are nowadays put to diverse uses in the industrial and household spheres. Pressure-sensitive adhesive tapes consist customarily of a carrier film which is furnished on one or both sides with a PSA. There are also pressure-sensitive adhesive tapes which consist exclusively of a layer of PSA and thus do not comprise a carrier film, these being referred to as transfer tapes. The composition of the pressure-sensitive adhesive tapes may differ greatly and is guided by the particular requirements of the various applications. The carriers consist customarily of polymeric films such as, for example, polypropylene, polyethylene or polyester, or else of paper, fabric or nonwoven.

The self-adhesive or pressure-sensitive adhesive compositions consist customarily of acrylate copolymers, silicones, natural rubber, synthetic rubber, styrene block copolymers or polyurethanes.

Acrylonitrile-butadiene rubbers, short code NBR, derived from nitrile butadiene rubber, denotes a synthetic rubber which is obtained by copolymerization of a acrylonitrile and buta-1,3-diene in proportions by mass of approximately 52:48 to 10:90. It is produced almost exclusively in aqueous emulsion. The resultant emulsions are used as they are (NBR latex) or processed to be solid rubber. The properties of the nitrile rubber are dependent on the ratio of the initial monomers and on its molar mass. The vulcanizates obtainable from nitrile rubber possess high resistance toward fuels, oils, fats, and hydrocarbons, and are distinguished relative to their natural-rubber counterparts by more favorable aging behavior, lower abrasion and reduced gas permeability. Its weathering resistance, on the other hand, is rather deficient.

Acrylonitrile-butadiene rubbers are available in a wide spectrum. As well as the acrylonitrile content, the various types are distinguished in particular via the viscosity of the rubber. This is usually stated by the Mooney viscosity. This viscosity in turn is determined on the one hand by the number of chain branches in the polymer and on the other hand by the molecular weight. With regard to the polymerization, a distinction is made in principle between what are called cold polymerization and hot polymerization. Cold polymerization takes place customarily at temperatures of 5 to 15° C. and, in contrast to hot polymerization, which is carried out customarily at 30 to 40° C., leads to a lower number of chain branches. NBR rubbers are available from a host of manufacturers such as, for example, Nitriflex, Zeon, LG Chemicals, and Lanxess.

Carboxylated NBR grades come about through terpolymerization of acrylonitrile and butadiene with small fractions of (meth)acrylic acid in emulsion. They are notable for high strength. The selective hydrogenation of the C,C double bond in NBR leads to hydrogenated nitrile rubbers (H—NBR) with improved stability to temperature increase (up to 150° C. in hot air or ozone) or to swelling agents (for example, sulfur-containing crude oils, brake fluids and/or hydraulic fluids).

Vulcanization is accomplished with customary sulfur crosslinkers, peroxides, or by means of high-energy radiation.

As well as carboxylated or hydrogenated NBR rubbers there are also liquid NBR rubbers. These rubbers are limited in their molecular weight during the polymerization by the addition of chain transfer agents, and are obtained accordingly as liquid rubbers.

In order to adjust application-relevant properties, PSAs can be modified by the admixing of tackifier resins, plasticizers, crosslinkers or fillers etc.

Amongst others, the PSAs may comprise what are called plasticizers. Well-known plasticizing agents are, for example, low molecular mass polyacrylates, plasticizing resins, phosphates or polyphosphates, paraffinic and naphthenic oils, oligomers such as oligobutadienes and oligoisoprenes, liquid terpene resins, vegetable and animal oils and fats. Plasticizing resins may have the same chemical basis as some tackifier resins, but usually differ from these in their softening point, which is <40° C.

The fields of application of electronic devices are increasing in line with their propagation. This is also giving rise to growing requirements related to the properties and also to the manufacturing of such products. Electronic devices of interest in the technical field of the invention are e.g. smartphones (cell phones), tablets, notebook computers, cameras, video-cameras, keyboards, touchpads, and the like.

Electronic, optical and precision-mechanical devices for the purposes of this specification are, in particular, devices as classified in Class 9 of the International Classification of Goods and Services for the Registration of Marks (Nice Classification), 10th edition (NCL(10-2013)), to the extent that they are electronic, optical or precision-mechanical devices, and also clocks and chronometers according to Class 14 (NCL(10-2013)), such as, in particular

- scientific, marine, measurement, photographic, film, optical, weighing, measuring, signaling, monitoring, rescuing, and instruction apparatus and instruments;
- apparatus and instruments for conducting, switching, transforming, storing, regulating, and monitoring electricity;
- image recording, processing, transmission, and reproduction devices, such as televisions and the like, for example
- acoustic recording, processing, transmission, and reproduction devices, such as broadcasting devices and the like, for example
- computers, calculating instruments and data-processing devices, mathematical devices and instruments, computer accessories, office instruments—for example, printers, faxes, copiers, word processors—, data storage devices
- elecommunications devices and multifunctional devices with a telecommunications function, such as telephones and answering machines, for example
- chemical and physical measuring devices, control devices, and instruments, such as battery chargers, multimeters, lamps, and tachometers nautical devices and instruments
optical devices and instruments
medical devices and instruments and those for sports people
clocks and chronometers
solar cell modules, such as electrochemical dye solar cells, organic
solar cells, thin-film cells,
fire-extinguishing equipment.

Technical development is going increasingly in the direction of devices which are ever smaller and lighter in design, allowing them to be carried at all times by their owner, and usually being generally carried. This is typically accomplished by realization of low weights and/or suitable size of such devices. Such devices are also referred to as mobile devices or portable devices for the purposes of this specification. In this development trend, precision-mechanical and optical devices are increasingly being provided (also) with electronic components, thereby raising the possibilities for minimization. On account of the carrying of the mobile devices, they are subject to increased loads—especially mechanical and chemical loads—for instance by impact on edges, by being dropped, by contact with other hard objects in a bag, or else simply by the permanent motion involved in being carried per se. Mobile devices, however, are also subject to a greater extent to loads due to moisture exposure, temperature effects, and the like, as compared with those "immobile" devices which are usually installed in interiors and which move little or not at all.

Listed below are a number of portable devices in which the pressure-sensitive adhesive of the invention may advantageously be used.

Cameras, digital cameras, photographic accessories (such as light meters, flashguns, diaphragms, camera casings, lenses, etc.), film cameras, video cameras, small computers (mobile computers, pocket computers, pocket calculators), laptops, notebook computers, netbooks, ultrabooks, tablet computers, handhelds, electronic diaries and organizers (called "Electronic Organizers" or "Personal Digital Assistants", PDAs, palmtops), modems, computer accessories and operating units for electronic devices, such as mice, drawing pads, graphics tablets, microphones, loudspeakers, games consoles, game pads, remote controls, remote operating devices, touchpads, monitors, displays, screens, touch-sensitive screens (sensor screens, touchscreen devices), projectors readers for electronic books (e-books), mini-TVs, pocket TVs, devices for playing films, video players, radios (including mini and pocket radios), Walkmans, Discmans, music players for e.g. CDs, DVDs, Blu-rays, cassettes, USB, MP3, headphones, cordless telephones, cell phones, smartphones, two-way radios, hands-free devices, devices for summoning people (pagers, beepers)

mobile defibrillators, blood sugar meters, blood pressure monitors, step counters, pulse meters torches, laser pointers mobile detectors, optical magnifiers, long-range vision devices, night vision devices, GPS devices, navigation devices, portable interface devices for satellite communications data storage devices (USB sticks, external hard drives, memory cards)

wristwatches, digital watches, pocket watches, chain watches, stopwatches.

For mounting applications in electronic devices—not only portable devices—reworkability of expensive components becomes increasingly important. Consequently, adhesive tapes used to adhere such components need to be removable and thus shall exhibit low separation force when being removed from the respective surfaces. It is desired that the adhesive tape can be removed without any residues because any additional cleaning step that might further harm the highly sensitive components of the device shall be avoided.

EP 1 426 407 A1 discloses an adhesive polymer composite comprising at least one, optionally hydrogenated, nitrile rubber polymer having a Mooney viscosity (ML 1+4@100° C.) below 30, optionally at least one filler and optionally at least one cross-linking agent.

WO 2017/025492 A1 relates to a pressure-sensitive adhesive material which contains as a base polymer at least one solid acrylonitrile butadiene rubber and adhesive resins, wherein the proportion of adhesive resin s is in the range from 30 to 130 phr and the acrylonitrile content in the solid acrylonitrile butadiene rubber is between 10 and 30 wt %.

US 2003/0134112 A1 describes a tape comprising a highly extensible, substantially non-recoverable backing bearing on at least one major surface thereof a layer of pressure-sensitive adhesive. The tape is capable of being removed therefrom after only being stretched at an angle no greater than about 35° from the surface of the substrate.

WO 2014/067667 A1 discloses a thermally debondable tape having a base adhesive layer and at least one thermally releasable adhesive layer comprising an adhesive and thermally expandable particles. The base adhesive layer has an adhesion of less than 2 N/20 mm at expansion temperature of the thermally expandable particles and an adhesiobn of more than 10 N/20 mm at 20° C.

WO 97/46631 A1 discloses a temperature-responsive adhesive article comprising
(a) a temperature-responsive carrier capable of changing its shape at a first transition temperature; and
(b) a thermomorphic pressure-sensitive adhesive on at least a portion of at least one surface of said carrier,
said thermomorphic pressure-sensitive adhesive being capable of changing its shape at a second transition temperature. The article can be designed to provide a wide variety of bonding and de-bonding properties.

WO 2014/066195 A1 describes a pressure sensitive adhesive composition adapted for selective debonding, the pressure sensitive adhesive composition comprising:
a continuous first phase comprising pressure sensitive adhesive matrix; and a discontinuous second phase comprising crosslinked silicone gel particles dispersed in the pressure sensitive adhesive matrix with a characteristic such that upon exposure to a debonding agent, the particles undergo a change in at least one of shape and volume.

There are various limitations in the debonding properties of the adhesive tapes known so far. "Stretch release" tapes require a die-cut shape to apply the stretching which cannot be realized in all applications due to complicated layout in many cases. Heat-based debonding normally requires temperatures of up to 110° C. In some cases there are highly sensitive components that will be damaged by such temperatures.

It is an object of the invention to provide pressure-sensitive adhesives based on acrylonitrile-butadiene rubbers which are available for technical applications, said adhesives exhibiting the profile of properties of customary PSAs, having good shock-resistance combined with easy removability of the adhesives from the substrate.

The invention accordingly provides a pressure-sensitive adhesive which comprises
    at least one acrylonitrile-butadiene rubber; and
    at least one tackifier resin,
and is characterized in that
the acrylonitrile content of the acrylonitrile rubber is less than 30 wt %; the pressure-sensitive adhesive comprises at least one rosin resin as tackifier resin; and
the entirety of all tackifier resins has an acid number of 6-150.

Such pressure-sensitive adhesives have proven to exhibit good shock-resistance as well as significantly improved removability from the substrate upon treatment with ethanol.

The pressure-sensitive adhesive of the invention may comprise one (single) or more acrylonitrile-butadiene rubber(s). In the following, "acrylonitrile-butadiene rubbers" is meant to comprise also the case where only one (single) acrylonitrile-butadiene rubber is present in the pressure-sensitive adhesive. Likewise, the term "the entirety of all acrylonitrile-butadiene rubbers" comprises the case where only one (single) acrylonitrile-butadiene rubber is present in the pressure-sensitive adhesive.

Preferably, the acrylonitrile content in the acrylonitrile-butadiene rubber is at least 10 wt %. More preferably, the acrylonitrile content in the acrylonitrile-butadiene rubber is from 12 to 25 wt %, more preferably from 15 to 22 wt %. If the pressure-sensitive adhesive of the invention comprises a plurality of acrylonitrile-butadiene rubbers, this preferably applies to all acrylonitrile-butadiene rubbers of the pressure-sensitive adhesive.

The acrylonitrile-butadiene rubbers may be admixed with inert release assistants, preferably selected from talc, silicates (talc, clay, mica), zinc stearate, and PVC powders, more particularly in an order of magnitude of 3 phr, based on the entirety of all acrylonitrile-butadiene rubbers of the pressure-sensitive adhesive.

Preferably, the at least one acrylonitrile-butadiene rubber is a solid acrylonitrile-butadiene rubber. In an embodiment of the invention, all acrylonitrile-butadiene rubbers of the pressure-sensitive adhesive are solid acrylonitrile-butadiene rubbers. In another embodiment, the at least one acrylonitrile-butadiene rubber is a solid acrylonitrile-butadiene rubber and the pressure-sensitive adhesive further comprises at least one liquid acrylonitrile-butadiene rubber, the acrylonitrile content in the liquid acrylonitrile-butadiene rubber being at least 10 and less than 30 wt %.

The pressure-sensitive adhesive of the invention may comprise one (single) or more such liquid acrylonitrile-butadiene rubber(s). The fraction of the entirety of all liquid acrylonitrile-butadiene rubbers is preferably up to 20 wt %, more preferably between 1 and 15 wt %, more preferably between 2 and 10 wt %, based on the total weight of the pressure-sensitive adhesive.

Liquid acrylonitrile-butadiene rubbers are distinguished from solid acrylonitrile-butadiene rubbers in that they have a softening point of <40° C.

The figures for the softening point Ts of oligomeric and polymeric compounds as use herein are based on the ring and ball method as per DIN EN 1427:2007, with corresponding application of the provisions (investigation of the oligomer or polymer sample instead of bitumens, with a procedure otherwise retained); the measurements take place in a glycerol bath.

The polymer basis of the pressure-sensitive adhesive (PSA) according to the invention preferably consists of solid, or solid and liquid, acrylonitrile-butadiene rubbers. More preferably, there is no other polymer in the PSA apart from acrylonitrile-butadiene rubbers. Preferably, the pressure-sensitive adhesive comprises acrylonitrile-butadiene rubbers to a total extent of 30 to 75 wt %, more preferably 40 to 65 wt %, based on the total weight of the pressure-sensitive adhesive.

In an embodiment of the invention, the PSA consists of solid and liquid acrylonitrile-butadiene rubbers, one or more tackifier resins, at least one aging inhibitor, and optionally at least one release assistant. In further embodiments, the PSA may furthermore comprise at least one plasticizer, at least one filler and/or at least one dye.

The term "tackifier resin" is understood by the skilled person to refer to a resin-based substance which increases the tack of a PSA compared to the same composition of the PSA not including the tackifier resin.

The pressure-sensitive adhesive comprises at least one rosin resin as tackifier resin. Rosin resins are also known as "colophony resins". The term "rosin resins" encompasses both natural and modified rosin. The rosin resins include, for example, natural rosin; dimerized rosin; partially hydrogenated rosin; fully hydrogenated rosin; esterified products of these kinds of rosin such as glycerol esters, pentaerythritol esters, ethylene glycol esters, and methyl esters; and rosin derivatives such as disproportionation rosin, fumaric acid-modified rosin, and lime-modified rosin.

Furthermore, the entirety of all tackifier resins of the pressure-sensitive adhesive according to the invention has an acid number of 6 to 150. Preferably, the entirety of all tackifier resins of the pressure-sensitive adhesive according to the invention has an acid number of at least 9.

The acid number, also referred to as acid value (or neutralization number or acidity) is the mass of potassium hydroxide (KOH) in milligrams that is required to neutralize one gram of a chemical substance. The acid number is a measure of the number of carboxylic acid groups in a chemical compound or in a mixture of compounds. In a typical procedure, a known amount of sample dissolved in an organic solvent (often isopropanol) is titrated with a solution of potassium hydroxide (KOH) of known concentration using phenolphthalein as a colour indicator.

The acid number is used to quantify the acidity of a substance. It is the quantity of base, expressed in milligrams of potassium hydroxide, that is required to neutralize the acidic constituents in 1 g of a sample.

The acid number can be calculated using the following equation:

$$AN=[(V_{eq}-b_{eq})*N*(56.1 \text{ g mol}^{-1})]/W_{samp}$$

where AN is the acid number, $V_{eq}$ is the volume of titrant (ml) consumed by the sample and 1 ml of spiking solution at the equivalent point, $b_{eq}$ is the volume of titrant (ml) consumed by 1 ml of spiking solution at the equivalent point, N is the molar concentration of titrant, and 56.1 g/mol is the molecular weight of KOH. $W_{samo}$ is the mass of the sample in grams.

Generally, OH- and COOH-group containing resins are the preferred tackifier resins of the pressure-sensitive adhesive. Therefore, preferably, at least 50 wt %, more preferably, at least 70 wt %, particularly preferably, at least 90 wt % of the entirety of all tackifier resins of the pressure-sensitive adhesive according to the invention are OH- and COOH-group containing tackifier resins. In particular, all tackifier resins of the pressure-sensitive adhesive according to the invention are OH- and COOH-group containing tackifier resins. Preferred OH-group containing tackifier resins of the pressure-sensitive adhesive are terpene-phenolic resins.

Preferably, at least 50 wt %; more preferably, at least 70 wt %; and particularly preferably, at least 90 wt % of the entirety of all tackifier resins of the pressure-sensitive adhesive according to the invention are rosin resins or a mixture of rosin resins and terpene-phenolic resins. In particular, all tackifier resins of the pressure-sensitive adhesive according to the invention are rosin resins or a mixture of rosin resins and terpene-phenolic resins.

Still preferably, at least 50 wt %; more preferably, at least 70 wt %; and particularly preferably, at least 90 wt % of the entirety of all tackifier resins of the pressure-sensitive adhesive according to the invention are rosin resins. In particular, all tackifier resins of the pressure-sensitive adhesive according to the invention are rosin resins.

Preferably, the pressure-sensitive adhesive according to the invention comprises tackifier resins in a total amount of 35 to 65 wt %, more preferably of 40 to 60 wt %, based on the total weight of the pressure-sensitive adhesive.

Further preferably, the pressure-sensitive adhesive according to the invention is free of any hydrocarbon resins. It has been observed that this causes an advantageous effect on the removability of the adhesive.

Preferably, the pressure-sensitive adhesive of the invention comprises at least one primary antioxidant, more preferably, at least one sterically hindered phenol; and/or at least one secondary antioxidant, more preferably at least one secondary antioxidant selected from phosphites, thioethers and C-radical scavengers. Further, preferably, the pressure-sensitive adhesive of the invention comprises at least one light stabilizer, especially at least one UV absorber and/or sterically hindered amine.

These substances advantageously provide stabilization of the adhesive against environmental and aging impacts.

Further additives which may be comprised by the pressure-sensitive adhesive according to the invention are e.g. fillers and dyes. The fillers may be reinforcing or non-reinforcing fillers. Preferably, fillers are selected from the group consisting of silicon dioxides, in particular spherical, acicular and irregular silicas; phyllosilicates;

calcium carbonates; zinc oxides; titanium dioxides; aluminum oxides; and aluminum oxide hydroxides.

Preferably, the pressure-sensitive adhesive according to the invention is free of any plasticizers and oils. It has been observed that this causes an advantageous impact on the shock resistance of the adhesive.

The maximum fraction of the entirety of all additives, i.e. all substances other than acrylonitrile-butadiene rubbers and tackifier resins, preferably is 15 wt %, more preferably 5 wt %, and particularly preferably 2 wt %, based on the total weight of the pressure-sensitive adhesive.

In order to enhance the cohesive properties of the pressure-sensitive adhesive, it may also be crosslinked, in particular through the addition of peroxides or by high-energy radiation. This may have positive effects on properties, such as shear resistance. The pressure-sensitive adhesive of the invention preferably is crosslinked.

The PSA is preferably utilized for the furnishing of carriers, to give adhesive tapes. Hence, a further subject matter of the present invention is an adhesive tape comprising a layer of a pressure-sensitive adhesive according to the invention.

Adhesive tapes in the sense of the invention are to comprehend all sheetlike or tapelike carrier formations coated on one or both sides with adhesive, hence including, in addition to conventional tapes, also decals, sections, diecuts (punched sheetlike carrier formations coated with adhesive), two-dimensionally extended structures (for example, sheets) and the like, and multilayer arrangements.

The expression "adhesive tape" also encompasses, furthermore, what are called "adhesive transfer tapes", in other words an adhesive tape consisting of a pressure-sensitive adhesive mass only. In the case of an adhesive transfer tape, the adhesive may be applied between flexible liners prior to application, these liners being provided with a release layer and/or having antiadhesive properties. For application, generally speaking, first liner is removed, the adhesive is applied, and then the second liner is removed.

The adhesive tape may be provided in fixed lengths, such as in the form of meter-length product, for example, or else as continuous product on rolls (Archimedean spiral) or even cross-wound spools.

The coat weight (coating thickness) of one layer of the pressure-sensitive adhesive according to the invention in an adhesive tape is preferably between 10 and 150 $g/m^2$, more preferably between 15 and 120 $g/m^2$. For transfer tapes, the coat weight particularly preferably is 30-100 $g/m^2$; for adhesive tapes further comprising at least a carrier layer it is particularly preferably 50 to 80 $g/m^2$.

In an embodiment of the invention, the adhesive tape further comprises a carrier layer. Carrier materials, preferably, are selected from the group consisting of paper; woven fabric; nonwoven; and films made of polyester such as polyethylene terephthalate (PET), polyethylene, polypropylene, polyurethane, oriented polypropylene, polyvinyl chloride, polylactic acid, cellulose, modified starch and polyhydroxyalkanoate. Woven fabric can be made of renewable sources, preferably of cotton, hemp, jute or stinging-nettle fibers. Particularly preferably, the carrier material is made of PET or polyurethane.

The carrier material may be furnished on one or both sides with the PSA. It is possible, furthermore, for the carrier layer to be provided with one or more coatings. Moreover, only one side of the pressure-sensitive adhesive tape may be furnished with the inventive PSA, and a different PSA may be used on the other side.

The adhesive tape is formed by application of the adhesive, partially or over the whole area, to the carrier. Coating may also take place in the form of one or more strips in lengthwise direction (machine direction), optionally in transverse direction (cross direction), but more particularly coating is over the full area. Furthermore, the pressure-sensitive adhesive may be applied in patterned dot format by means of screen printing, in which case the dots of adhesive may also differ in size and/or distribution, or by gravure printing of lines which join up in the lengthwise and transverse directions, by engraved-roller printing, or by flexographic printing. The adhesive may be in the form of domes (produced by screen printing) or else in another pattern such as lattices, stripes, zig-zag lines. Furthermore, for example, the PSA may also have be applied by spraying, producing a more or less irregular pattern.

In an embodiment, the adhesive tape further comprises an adhesion promoter, also referred to as primer layer, between the carrier layer and the layer of pressure-sensitive adhesive. Such primer layer may improve the interlayer bonding strength between the adhesive and the carrier.

The primers preferably is a dispersion or solvent system based on isoprene- or butadiene-containing rubber, acrylate rubber, polyvinyl, polyvinylidene and/or cyclo rubber. It may further comprise isocyanates or epoxy resins which may improve the adhesion and in some cases also increase the shear strength of the PSA. The adhesion promoter may likewise be applied as a coextrusion layer on one side of the carrier layer.

In a further embodiment, a surface of the carrier layer being in contact with the pressure-sensitive adhesive has been subject to a physical pretreatment before bringing it into contact with the PSA. Suitable physical surface treatments include flame treatment and corona or plasma treatment.

Furthermore, in single-sided adhesive tapes, the carrier layer surface opposite the surface being in contact with the pressure-sensitive adhesive may have been subject to an antiadhesive physical treatment or coating, and more particularly may be furnished with a release layer.

Suitable release layers may be based on compounds having linear or branched alkyl or alkenyl groups having a C number of at least 10, e.g. stearyl compounds like polyvinylstearylcarbamate; stearyl compounds of transition metals such as Cr or Zr, ureas formed from polyethylenimine and stearyl isocyanate, stearylsulfosuccinates and stearylsulfosuccinamates; chromium complexes of $C_{14}$ to $C_{28}$ fatty acids; acrylic polymers with perfluorinated alkyl groups; and silicones like poly(dimethylsiloxanes) or fluorosilicone compounds.

The adhesive tape may likewise have been laminated with a release liner which customarily comprises a base material of polyethylene, polypropylene, polyester or paper which has been coated with a silicone system on one or both sides.

The adhesive tape of the invention may be produced by any method known to the skilled person. Accordingly, the PSA, including the additives, in solution in a suitable solvent, may be coated onto a carrier or release film by means of engraved-roller application, comma bar coating, multiroll coating, or in a printing process, after which the solvent may be removed in a drying tunnel or drying oven. Alternatively, the carrier material or release film may also be coated in a solvent-free process. For this purpose, the acrylonitrile-butadiene rubber may be heated in an extruder and melted. Further operating steps may take place in the extruder, such as mixing with the additives described above, filtration or degassing. The melt may then be coated by means of a calander onto the carrier layer or release film.

The pressure-sensitive adhesive tape of the invention preferably has a peel adhesion on a steel substrate of at least 4.0 N/cm, more preferably of at least 6.0 N/cm at a coat weight of 50 g/m$^2$.

EXAMPLES

Test Methods

Unless otherwise indicated, the measurements are carried out under test conditions of 23±1° C. and 50±5% relative humidity.

Impact Resistance; z-plane (DuPont Test)

A square sample with a frame shape was cut from the adhesive tape under investigation (external dimensions 33 mm×33 mm; border width 2.0 mm; internal dimensions (window cutout) 29 mm×29 mm). This sample was adhered to a polycarbonate (PC) frame (external dimensions 45 mm×45 mm; border width 10 mm; internal dimensions (window cutout) 25 mm×25 mm; thickness 3 mm). On the other side of the double-sided adhesive tape, a PC window measuring 35 mm×35 mm was adhered. The bonding of PC frame, adhesive tape frame and PC window took place in such a way that the geometric centers and the diagonals lay in each case one above another (corner to corner). The bond area was 248 mm$^2$. The bond was pressed under 10 bar for 5 s and stored for 24 hours with conditioning at 23° C./50% relative humidity.

Immediately after storage, the bonded assembly of PC frame, adhesive tape and PC window with the protruding edges of the PC frame was clamped into a sample holder in such a way that the assembly was oriented horizontally and the PC window was beneath the frame. The sample holder was subsequently inserted centrally into the intended receptacle of the DuPont impact tester. The impact head, weighing 150 g, was inserted such that the circular impact geometry with a diameter of 24 mm impacted centrally and flush on the window side of the PC window.

A weight with a mass of 150 g, guided on two guide rods, was dropped vertically from a height of 5 cm onto the assembly thus arranged of sample holder, sample and impact head (measuring conditions 23° C., 50% relative humidity). The height of the falling weight was raised in steps of 5 cm until the impact energy introduced caused destruction of the sample as a result of the impact stress, and the PC window parted from the PC frame.

In order to be able to compare experiments with different samples, the energy was calculated as follows:

$$E[J]=\text{height}[m]*\text{mass weight}[kg]*9.81 \text{ kg/m}*s^2$$

For each product, five samples were tested, and the average energy value was reported as a characteristic value for the impact resistance. A value of at least 0.45 J is considered to indicate good impact resistance.

Push-Out Strength (z-Plane)

The push-out test provides information on the extent to which the bond of a component in a frame-shaped body, such as of a window or display in a housing, is resistant.

A rectangular, frame-shaped sample was cut out of the adhesive tape under investigation (outside dimensions 33 mm×33 mm; border width 2.0 mm in each case; inside dimensions (window opening) 29 mm×29 mm, bond area 248 mm$^2$ on each of the top and bottom sides). This sample was adhered to a rectangular PC plastic frame (PC=polycarbonate) (outside dimensions 40 mm×40 mm; border width of the long borders 8 mm in each case; border width of the short borders 10 mm in each case; inside dimensions (window opening) 24 mm×24 mm; thickness 3 mm). Adhered on the other side of the double-sided adhesive tape sample was a rectangular PC sheet with dimensions of 35 mm×35 mm. The full bond area of the adhesive tape available was utilized. The PC frame, adhesive tape sample and PC window were bonded such that the geometric centers, the bisecting lines of the acute diagonal angles and the bisecting lines of the obtuse diagonal angles of the rectangles each lay on top of one another (corner on corner, long sides on long sides, short sides on short sides). The bond area was 248 mm$^2$. The bond was pressed at 248 N for 5 s and stored for 24 hours with conditioning at 23° C./50% relative humidity.

Immediately after storage, the adhesive assembly composed of PC frame, adhesive tape and PC sheet was placed with the protruding edges of the PC frame onto a frame structure (sample holder) in such a way that the assembly was oriented horizontally and the PC sheet pointed downward, hanging freely.

A plunger is then moved through the window of the PC frame, perpendicularly from above, at a constant speed of 10 mm/s, so that it presses centrally onto the PC plate, and a record is made of the respective force (determined from respective pressure and contact area between plunger and plate) as a function of the time from the first contact of the plunger with the PC plate until shortly after the plate has fallen (measuring conditions 23° C., 50% relative humidity). The force acting immediately prior to the failure of the adhesive bond between PC plate and PC frame (maximum force $F_{max}$ in the force-time diagram in N) is recorded as the answer of the push-out test.

Push-Out Strength for Removability (EtOH/Water)

For the determination of removability of the adhesive tape under the influence of EtOH/water, the specimens manufactured for the push-out strength test as described hereinbefore were stored at 65° C. and 90% relative humidity in a 75:25 (vol %) mixture of ethanol and water. For the ethanol/water storage a closeable vessel was used in order to prevent loss of ethanol by evaporation. Following storage, the specimens are first rinsed off with distilled water and then stored for 24 hours at 23° C. and 50% relative humidity. Only then the push-out strength test as described above was repeated.

The drop of the maximum force $F_{max}$ in % is given as the result; a high drop (at least 35%) indicates good removability of the tape.

Preparation of the PSAs

The pressure-sensitive adhesives (PSAs) set out in the examples were homogenized as solvent-based compositions in a kneading apparatus with a double-sigma kneading hook. The solvent used was butanone (methyl ethyl ketone, 2-butanone). The kneading apparatus was cooled by means of water cooling.

In a first step, the solid acrylonitrile-butadiene rubber was pre-swollen with the same amount of butanone at 23° C. for 12 hours. This preliminary batch was then kneaded for 2 hours. Subsequently, again, the amount of butanone selected above and, optionally, the liquid NBR rubber were added in two steps with kneading in each case for 10 minutes. Thereafter the tackifier resin was added as a solution in butanone with a solids content of 50%, and homogeneous kneading was continued for 20 minutes more. The final solids content is adjusted to 30 wt % by addition of butanone.

Production of the Test Specimens

The PSA was coated onto a PET film which was 23 μm thick and etched with trichloroacetic acid by means of a coating knife on a commercial laboratory coating bench (Sondermaschinen Oschersleben GmbH). The butanone was evaporated in a forced air drying cabinet at 105° C. for 10 minutes. The slot width during coating was adjusted so as to achieve a coat weight of 50 g/m² following evaporation of the solvent. The films freed from the solvent were subsequently lined with siliconized PET film and stored pending further testing at 23° C. and 50% relative humidity.

Examples

TABLE 1

Acrylonitrile-butadiene rubbers used

| Name | ACN content [wt %] | Mooney viscosity ML 1 + 4, 100° C. [MU] |
|---|---|---|
| Nipol ® 401 | 18.5 | 73 to 83 |
| Nipol ® 401LL | 18.5 | 32 to 44 |
| Nipol ® DN 2850 | 28.0 | 45 to 55 |

TABLE 2

Tackifier resins used

| Name | Chemical basis | Manufacturer | Softening point | OH/acid no. |
|---|---|---|---|---|
| Dertophene ® T 110 | Terpene-phenolic resin | DRT | 112° C. | OH no. 50 |
| Dertophene ® T | Terpene-phenolic resin | DRT | 95° C. | OH no. 35 |
| Dertophene ® H150 | Terpene-phenolic resin | DRT | 118° C. | OH no. 145 |
| Picco ® AR85 | Aromatically modified hydrocarbon resin Eastman | Eastman | 87° C. | — |
| Picco ® AR100 | Modified aromatic hydrocarbon resin | Eastman | 101° C. | — |
| Foral ® 85-E | Hydrogenated rosin ester | Eastman | 85° C. | Acid no. 9 |
| Foral ® 105-E | Hydrogenated rosin ester | Eastman | 101° C. | Acid no. 14 |
| Foral ® AX-E | Fully hydrogenated rosin | Eastman | 80° C. | Acid no. 165 |

TABLE 3

Plasticizers used

| Name | ACN content/ chemical nature [wt %] | Viscosity [MU] |
|---|---|---|
| Nipol ® 1312LV | 26 | 9.000-16.000 (Brookfield, [mPa*s], spindle 4, 12 rpm, 50° C.) |
| Indopol ® H-100 | Polybutene (PIB) | 200-235 cSt (100° C.) |

TABLE 4

Composition of the examples according to the invention

| Raw material | 1 | 2 | 3 | 4 | 5 | 6 |
|---|---|---|---|---|---|---|
| | | | Initial mass of solids [wt %] | | | |
| Nipol ® 401 | 57 | 57 | 57 | 50 | 45 | 57 |
| Foral ® 85-E | 43 | 21.5 | 21.5 | 50 | 55 | 21.5 |
| Foral ® 105-E | | 21.5 | | | | |
| Foral ® AX-E | | | 21.5 | | | |
| Dertophene ® H150 | | | | | | 21.5 |

TABLE 5

Composition of the comparative examples

| Raw material | 7 | 8 | 9 | 10 | 11 | 12 | 13 | 14 | 15 | 16 |
|---|---|---|---|---|---|---|---|---|---|---|
| | | | | Initial mass of solids [%] | | | | | | |
| Nipol ® 401 | 57 | 57 | | | 57 | 57 | 63 | 57 | | 57 |
| Nipol ® 401LL | | | 57 | | | | | | 54 | |
| Nipol ® DN 2850 | | | | 53 | | | | | | |
| Dertophene ® T 110 | | | | | | | | | | 43 |
| Dertophene ® T | | | | | | | | 43 | 41 | |
| Dertophene ® H150 | | | | | 39 | | 43 | 37 | | |
| Picco ® AR85 | 43 | | 43 | | | | | | | |
| Picco ® AR100 | | 43 | | | | | | | | |
| Foral ® AX-E | | | | 43 | | | | | | |
| Nipol ® 1312LV | | | | | | 8 | | | | |
| Indopol ® H-100 | | | | | | | | | 5 | |

TABLE 6

Test results of the examples according to the invention

| test | 1 | 2 | 3 | 4 | 5 | 6 |
|---|---|---|---|---|---|---|
| | | | Example no. | | | |
| DuPont [J] | 0.63 | 0.54 | 0.54 | 0.50 | 0.49 | 0.56 |
| Push-out [N] | 133 | 93 | 131 | 135 | 124 | 187 |
| Push-out drop [%] | 39 | 40 | 46 | 61 | 82 | 44 |

TABLE 7

Test results comparative examples

| test | 7 | 8 | 9 | 10 | 11 | 12 | 13 | 14 | 15 | 16 |
|---|---|---|---|---|---|---|---|---|---|---|
| | | | | Example no. | | | | | | |
| DuPont [J] | 0.47 | 0.38 | 0.57 | 0.15 | 0.15 | 0.35 | 0.38 | 0.61 | 0.44 | 0.56 |
| Push-out [N] | 165 | — | 174 | 314 | 107 | 260 | 198 | 158 | 165 | 173 |
| Push-out drop [%] | 7 | — | 14 | 87 | 84 | 76 | 47 | 33 | 35 | 30 |

The invention claimed is:
1. A pressure-sensitive adhesive comprising
   at least one acrylonitrile-butadiene rubber; and
   at least one tackifier resin,
wherein
the acrylonitrile content of the acrylonitrile-butadiene rubber is less than 30 wt %;
the pressure-sensitive adhesive comprises at least one rosin resin as tackifier resin;
wherein at least 50 wt % of the entirety of all tackifier resins of the pressure-sensitive adhesive comprise a mixture of rosin resins and terpene-phenolic resins;
the entirety of all tackifier resins has an acid number of 6-150; and
the pressure-sensitive adhesive comprises tackifier resins to a total extent of 40 to 70 wt %, based on a total weight of the pressure-sensitive adhesive.

2. A pressure-sensitive adhesive according to claim 1, wherein the acrylonitrile content in the acrylonitrile-butadiene rubber is at least 10 wt %.

3. The pressure-sensitive adhesive according to claim 1, wherein the acrylonitrile-butadiene rubber is a solid acrylonitrile-butadiene rubber.

4. The pressure-sensitive adhesive according to claim 3, wherein the pressure-sensitive adhesive further comprises at least one liquid acrylonitrile-butadiene rubber, the acrylonitrile content in the liquid acrylonitrile-butadiene rubber being at least 10 and less than 30 wt %.

5. The pressure-sensitive adhesive according to claim 1, wherein the entirety of all tackifier resins has an acid number of at least 9.

6. The pressure-sensitive adhesive according to claim 1, wherein the pressure-sensitive adhesive is free of oils and plasticizers.

7. A method of bonding parts in mobile electronics devices comprising bonding the parts with a pressure-sensitive adhesive according to claim 1.

* * * * *